(12) United States Patent
Arkan et al.

(10) Patent No.: US 9,969,377 B2
(45) Date of Patent: May 15, 2018

(54) CENTER BEARING OF ADAPTER PLATE COMPRISING RUBBER AND RIGID PLASTIC MEMBERS DEVELOPED FOR SPRING BRAKE ACTUATORS

(71) Applicant: ARFESAN ARKAN FREN ELEMANLARI SANAYI VE TICARET A.S., Kocaeli (TR)

(72) Inventors: Fuat Burtan Arkan, Kocaeli (TR); Yavuz Battal, Kocaeli (TR); Omer Faruk Kulac, Kocaeli (TR)

(73) Assignee: ARFESAN ARKAN FREN ELEMANLARI SANAYI VE TICARET A.S., Kocaeli (TR)

( * ) Notice: Subject to any disclaimer, the term of this patent is extended or adjusted under 35 U.S.C. 154(b) by 26 days.

(21) Appl. No.: 15/113,440

(22) PCT Filed: Aug. 11, 2014

(86) PCT No.: PCT/TR2014/000323
§ 371 (c)(1),
(2) Date: Jul. 22, 2016

(87) PCT Pub. No.: WO2015/122861
PCT Pub. Date: Aug. 20, 2015

(65) Prior Publication Data
US 2017/0001618 A1    Jan. 5, 2017

(30) Foreign Application Priority Data

Feb. 14, 2014 (TR) .................................. 2014/01719

(51) Int. Cl.
*B60T 17/08*     (2006.01)
*F16D 65/28*    (2006.01)
(Continued)

(52) U.S. Cl.
CPC ............ *B60T 17/083* (2013.01); *F16D 65/28* (2013.01); *F16D 2125/08* (2013.01); *F16D 2125/12* (2013.01); *F16D 2125/582* (2013.01)

(58) Field of Classification Search
CPC ........ B60T 17/083; B60T 17/08; B60T 15/02; F16D 65/28; F16D 2125/08; F16D 2125/12; F16D 2125/582; F16D 65/14
See application file for complete search history.

(56) References Cited

U.S. PATENT DOCUMENTS

| | | | |
|---|---|---|---|
| 3,977,308 A * | 8/1976 | Swander, Jr. ......... | B60T 17/083 92/130 A |
| 5,301,715 A * | 4/1994 | Becker .................. | E03C 1/0401 137/359 |
| 2006/0131116 A1 | 6/2006 | Plantan et al. | |

FOREIGN PATENT DOCUMENTS

| CA | 2550930 A1 | 1/2007 | |
|---|---|---|---|
| CA | 2806268 A1 * | 9/2013 | ............ B60T 17/083 |

(Continued)

*Primary Examiner* — Melanie Torres Williams
(74) *Attorney, Agent, or Firm* — Gokalp Bayramoglu

(57) ABSTRACT

This invention is related to improving the sealing of the adapter plate inside the spring brake actuator and to improving the bearing of the intermediate shaft and the adapter plate. The invention is related to a new design regarding the bearing section providing sealing between the intermediate shaft and the adapter plate, which is a part of the spring brake actuator. The present invention is related to the development of two pieced bearing member having different hardness and being produced from different materials one of which is a rigid plastic piece which prevents force losses and decreases lateral loads, and the other of which is the rubber means.

1 Claim, 8 Drawing Sheets

(51) Int. Cl.
    *F16D 125/08*     (2012.01)
    *F16D 125/12*     (2012.01)
    *F16D 125/58*     (2012.01)

(56) References Cited

FOREIGN PATENT DOCUMENTS

| | | | |
|---|---|---|---|
| FR | 2574147 A1 | 6/1986 | |
| TR | 200200762 U | 10/2002 | |
| TR | 200807310 U | 12/2008 | |
| TR | 201007609 A2 | 4/2012 | |
| WO | WO9421501 A1 | 9/1994 | |
| WO | WO-9628331 A1 * | 9/1996 | ............ B60T 17/083 |

* cited by examiner

CENTER BEARING OF ADAPTER PLATE COMPRISING RUBBER AND RIGID PLASTIC MEMBERS DEVELOPED FOR SPRING BRAKE ACTUATORS

TECHNICAL FIELD

This invention is related to developing the bearing of an adapter plate and an intermediate shaft and to increasing the impermeability of the adapter plate located in the spring brake actuator.

BACKGROUND

The spring brake actuators used nowadays are generally separated into two groups. These are the diaphragm-diaphragm spring brake actuators and diaphragm-piston spring brake actuators. The spring brake actuators are used in heavy commercial vehicles (such as trucks, trailers, lorries, busses etc.)

The diaphragm-diaphragm brake chambers, comprise a service brake chamber which is engaged in normal driving conditions and a parking chamber that is engaged when there is air leakage or when the air is released on purpose (pulling the handbrake). The service chamber carries out the braking process when the vehicle is being slowed down or stopped, and the parking chamber is used when the vehicle is fixed. In other words when the service chamber functions when the foot brake is actuated and the parking chamber functions when the hand brake of the vehicle is actuated.

The parking chamber is the section between the emergency diaphragm and the adapter plate formed by the connection of the adapter plate and the spring housing in any kind or shaped connection. The parking chamber section of the brake actuator generally comprises a strong spring, an emergency diaphragm, an intermediate shaft flange and a return spring. When the vehicle is moving, pressurized air which is provided continuously by the compressor, is present inside the parking chamber. The pressurized air, ensures that the emergency spring is compressed as in the brake off position.

When there is a pressure decrease in the vehicle air system due to any kind of reason or when the vehicle is being parked (the handbrake is "on" position), the air pressure in the parking chamber decreases or is completely released. In such a case the flange can no longer compress the spring and the spring is released. Once the spring is released, the force of the spring is transmitted to the service chamber by means of the intermediate shaft located at the center of the adapter plate and from here to the wheels of the vehicle.

Several designs have been created in order to solve the abrasion problem of the center bearing of adapter plate. However the designs that have been created, are not directed to eliminate the reason that causes the abrasion but are aimed to decrease said abrasion. In some of these designs plastic bearing materials and in others metallic bearing materials are used.

In the application numbered TR 2008 07310 Y of the prior art, it has been aimed to decrease the abrasion of the intermediate shaft by friction between adapter plate and intermediate shaft, when it is in motion, by using a plastic bearing sealing member (14), plastic bearing (13), o-ring, o-ring channels, piston rings, ring channels and connector shells. The task of each of the sealing members mentioned above is bearing the intermediate shaft and to prevent the unwanted decrease of air pressure inside the parking chamber by preventing air flow to service chamber from parking chamber by means of the o-ring used on circumference. However this design is quite complex and the number and variety of the connection means used are high, thus leading to high installation and production costs.

In the TR2002 00762 Y application the adapter plate itself has been used instead of using a separate bearing means. The sealing means mounted to the channels that open up to the center of adapter plate provide impermeability.

In the known state of the art, v-shaped sealing means mounted into the shells on the adapter plate as mentioned in the patent application file numbered CA2550930A1 have been used in order to provide said bearing and sealing.

In the invention subject to the application number TR 2010/07609 in the known state of the art, it has been aimed to decrease abrasion caused by lateral loads of the emergency spring, increase the motion flexibility of the intermediate shaft by using a single solid rubber bearing member for the intermediate shaft and the adapter plate bearing and also impermeability has been aimed. However the motion flexibility of the rubber bearing design subject to the invention, cause unwanted lateral loads and fluctuations in the force curves and sealing problems and endangers the structural integrity of the spring brake actuator. By using a single solid rubber bearing member in the bearing section, it has been aimed to increase the motion flexibility of the intermediate shaft which is forced to move angularly or radially due to the emergency spring lateral loads, and to decrease the pressure applied onto the bearing section and thus to decrease the abrasion occurring in the bearing means in said bearing section. However increasing the motion flexibility of the intermediate shaft by means of a single solid rubber bearing also increases the radial and angular motion of the intermediate shaft and this leads to axial power losses and to output force fluctuations. Moreover it has been observed that increasing the radial and angular motion of the intermediate shaft, leads to the disruption of contact between the intermediate shaft in the bearing region and the bearing means which in turn leads to impermeability problems. In the present invention a rigid plastic bearing means has been added to the rubber bearing member to provide a two pieced bearing. While sealing is provided at the bearing region by means of the rubber bearing members, it has been aimed to improve the bearing of the intermediate shaft using the rigid plastic bearing means and to decrease the radial and angular motions arising from lateral loads and to prevent axial output force losses and fluctuations. As a result, it has been aimed to strengthen the bearing of the intermediate shaft using the rubber bearing means which provide sealing on its own and which prevents metal-metal contact and decreases abrasion of the bearing and to decrease force losses and abrasion providing sealing using the rigid plastic bearing means which prevents force losses.

Another document known in the state of the art is the patent publication numbered WO9421501A1. In this publication 3 different variants have been explained for center bearing of adapter plate.

The first variant has been shown in the attached FIG. 8, and the explanations in this publication comprise polymer rings and elastomeric impermeability members in the center bearing of adapter plate. The patent application number WO9421501A1 comprises 2 polymer rings (FIGS. 8, 84,86) 2 o-rings (FIGS. 8, 98, 96) and 3 channels (FIG. 8, 90,92,94) to act as bearing for the rings. Besides this, the present invention comprises one rubber sealing means and one form-fit connected rigid plastic polymer ring. And in the present invention there are no o-rings and channels. Sealing is provided by inner sealing rings and outer sealing rings around the rubber bearing member.

In the 2nd and 3rd variants described in the patent application numbered WO9421501A1 the center bearing can be seen in FIGS. 9 and 10. It comprises the described polymer rings (FIGS. 9 and 10, 108,110), o-ring (FIGS. 9 and 10, 114,124,126) and the protrusions and indentations (FIGS. 9 and 10, 102,104) and channels (FIGS. 9 and 10J 120,122). Besides this, the present invention sealing and bearing has been provided without the need for protrusions and indentations on adapter plate, channels and the o-ring.

According to the bearing variants described in the patent application document numbered WO9421501A1 it has been aimed to prevent metal-metal contact of the intermediate shaft and the adapter plate. In the present invention it has been aimed not only to prevent the metal-metal contact of the intermediate shaft and the adapter plate, it has also been aimed to strengthen the bearing between the intermediate shaft and the adapter plate and to decrease lateral loads and force losses.

It is also possible perceive the bearing described in the patent application numbered US2006131116A1 related to the subject of the present invention with the bearing of the known state of the art. The bearing described in this publication has been provided with a monolithic nut ring. In the present patent application is related with two-pieced form-fit bearing comprising rigid plastic and rubber member. The bearing type of the nut ring is different to the bearing of the form-fit rubber member. Moreover in the patent application numbered US2006131116A1 it has been not aimed for the bearing between the intermediate shaft and the adapter plate to be strengthened and for the loss of lateral loads and forces to be decreased.

SUMMARY OF THE INVENTION

The following has been aimed by using a two pieced bearing having different hardness instead of the monolithic rubber bearing used in the center bearing of the adapter plate and the intermediate shaft bearing of the prior art:

By taking into account that increasing the motion flexibility of the intermediate shaft, leads to the increase of the force losses and lateral loads and to fluctuations of the output force of the chamber and to sealing problems as it interrupts the contact between the intermediate shaft and the bearing members; a rigid plastic member is used in order to limit the motion flexibility of the intermediate shaft and as a result, the bearing of the intermediate shaft providing force transfer is improved and the motion flexibility is limited and force losses and lateral loads are decreased, Metal-metal contact is prevented by the usage of rubber bearing member, abrasion is decreased, sealing is provided by means of inner and outer sealing rings.

It has been aimed through this invention to prevent the metal-metal contact of the adapter plate and the intermediate shaft, to decrease abrasion, to provide proper bearing of the intermediate shaft which enables force transfer, to increase sealing properties and to decrease force losses by adding a rigid plastic bearing member to the rubber bearing which ensures sealing, to prevent abrasion.

By the proper bearing of the intermediate shaft which transfers force, the unwanted lateral loads, force losses and the variables of the output forces have been decreased, the friction surfaces of the intermediate shaft has been rendered more rigid and homogenous by means of the bearing means and sealing has been improved.

BRIEF DESCRIPTION OF THE DRAWINGS

The invention has been further described in detail by means of the attached figures and said figures illustrate the following.

Figure 1:
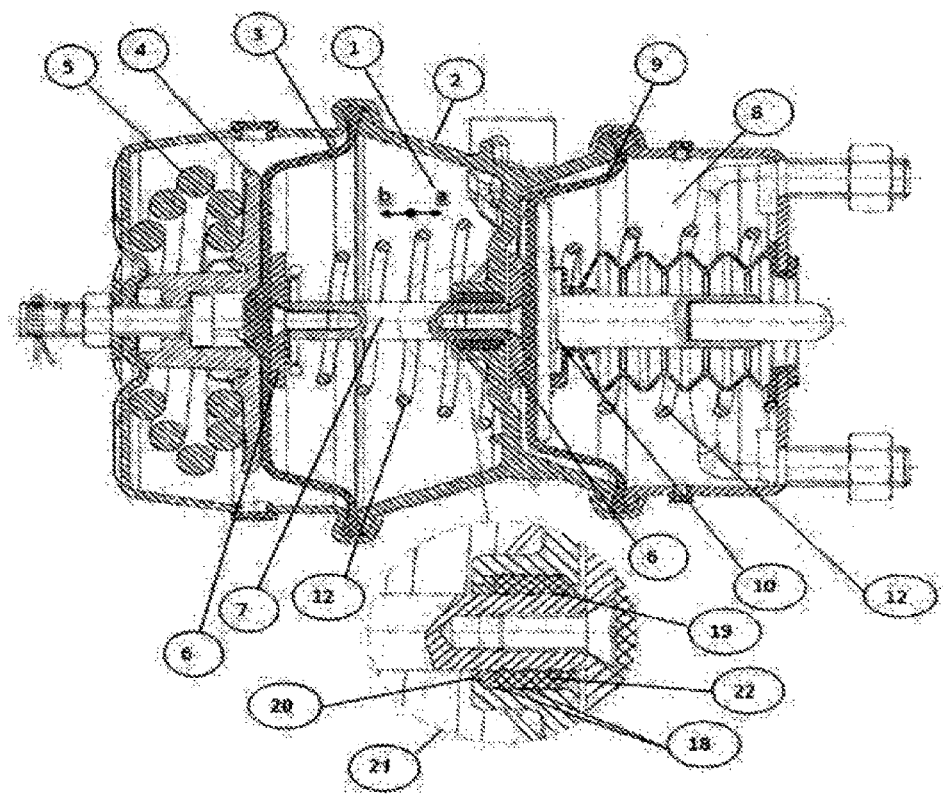
FIG. 1—Section view of the diaphragm-diaphragm type spring brake actuator comprising the rubber and rigid plastic bearing members, and the detailed view of the center bearing of the adapter plate and the intermediate shaft subject to the invention.

In the figures (FIGS. 1, 2, 3, 4, 5, 6 and 7) has been numbered and their references have been given below.

1. Parking chamber
2. Adapter plate
3. Emergency diaphragm
4. Flange
5. Emergency spring
6. Intermediate shaft flange
7. Intermediate shaft
8. Service chamber
9. Service diaphragm
10. Shaft
11. O-ring type sealing member (prior art)
12. Return spring
13. Plastic bearing (prior art)
14. Plastic bearing sealing member (prior art)
15. Rubber bearing (prior art)
16. Sealing ring (prior art)
17. Rubber bearing member (prior art monolithic)
18. Outer sealing rings
19. Inner sealing rings
20. Rigid plastic bearing member
21. Two pieced center bearing
22. Rubber bearing member
23. Mounting slit of rigid plastic bearing member

DETAILED DESCRIPTION OF THE EMBODIMENTS

The invention is basically a spring brake actuator comprising rubber bearing member (22) that provide sealing using the sealing rings (18,19) which decrease abrasion, by interrupting metal-metal contact in the bearing of the intermediate shaft (7) and the adapter plate (2); and rigid plastic bearing member (20) which strengthens the bearing of the intermediate shaft (7) by limiting the radial and angular movement of said shaft, and which decreases sealing problems, force losses and force fluctuations.

In vehicles with spring brake chambers when the spring brake is used the pressurized air inside the parking chamber (1) is released and the emergency spring (5) is released, the emergency spring (5) pushes the flange (4) and the intermediate shaft flange (6) towards the direction "a" and as a result the intermediate shaft (7) enables the movement of service diaphragm (9) towards the service chamber (8). The diaphragm (9) transfers the force to the slack adjuster by means of the shaft (10) located inside the service chamber.

During this forward motion of the intermediate shaft (7), the intermediate shaft (7), is forced to rotate angularly and radially due to lateral loads of the emergency spring (5). During this forced action, the rigid plastic bearing member (20) strengthens the bearing of the intermediate shaft (7) and this in turn limits the radial and angular motions. So, The contact between the intermediate shaft (7) and the bearing members is interrupted due to the radial and angular motions of the intermediate shaft (7) and the air leakage of the intermediate shaft (7) bearing is prevented. Moreover during the forward motion of the intermediate shaft (7) the contact between the intermediate shaft (7) which is being forced to rotate radially and angularly, is prevented due to the rubber bearing member (22).

When the braking is stopped, the system needs to come back to its original position. In order to reach this aim, first of all the parking chamber (1) is refilled with pressurized air and emergency spring (5) is compressed. Following the elimination of the pushing force of the emergency spring (5), the return springs which are (12) inside the parking chamber (1) and the service chamber (8) brings the emergency diaphragm (3) and the service diaphragm (9) back to their initial positions, and the braking force is eliminated by movement of the shaft (10) towards the direction "b".

When the braking is desired to be stopped, the pressurized air that is present inside the parking chamber (1), is transferred to the center bearing (21) of the adapter plate (2), comprising rubber (22) and rigid plastic bearing members (20). The sealing is provided by means of the sealing rings (18,19) located at the inner and outer surfaces of the rubber bearing member (22). A plurality of rings, increase the safety of the sealing.

Figure 3:
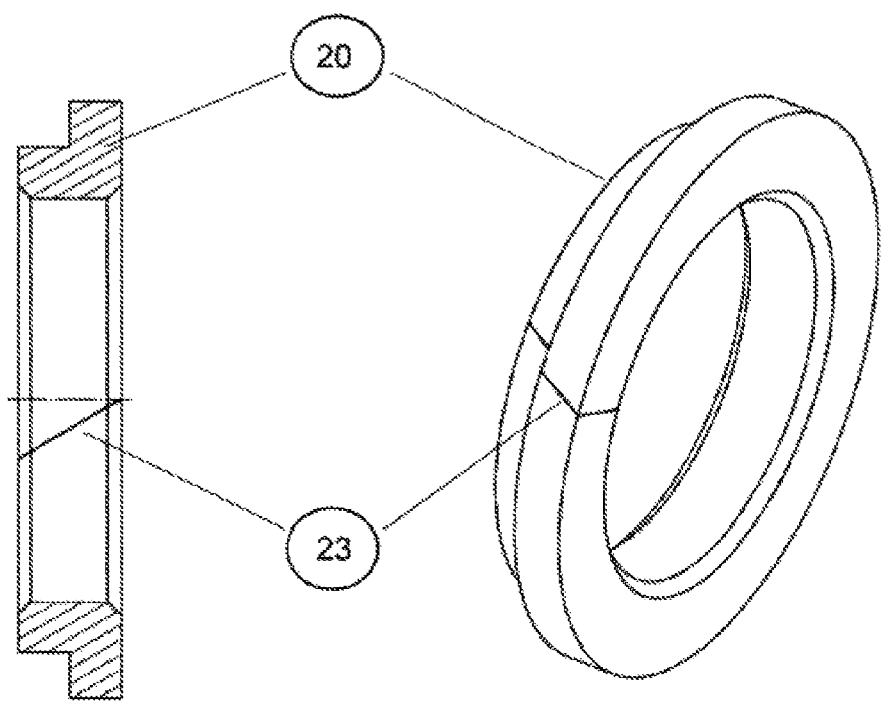
FIG. 3—Detailed view of the rigid plastic bearing member subject to the invention.
Figure 4:
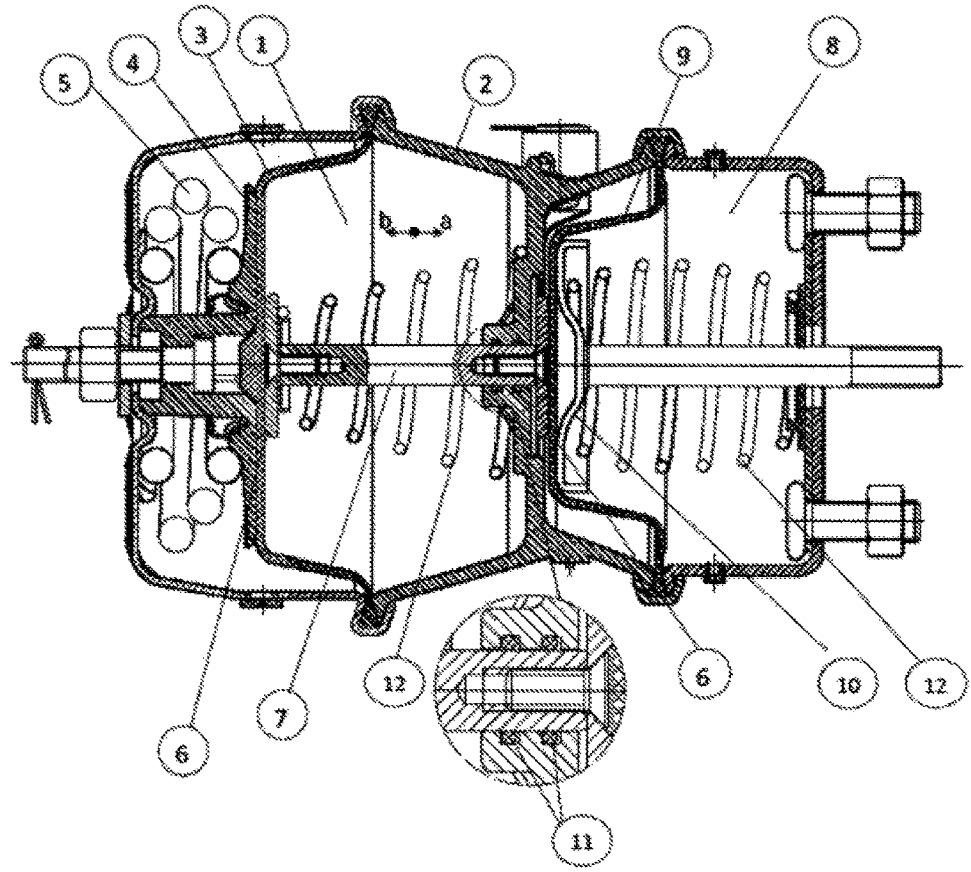
FIG. 4—Detailed view of the intermediate shaft bearing which comprises double o-ring of the diaphragm-diaphragm type spring brake actuator and section view of this diaphragm-diaphragm type spring brake actuator subject to the prior art.
Figure 5:
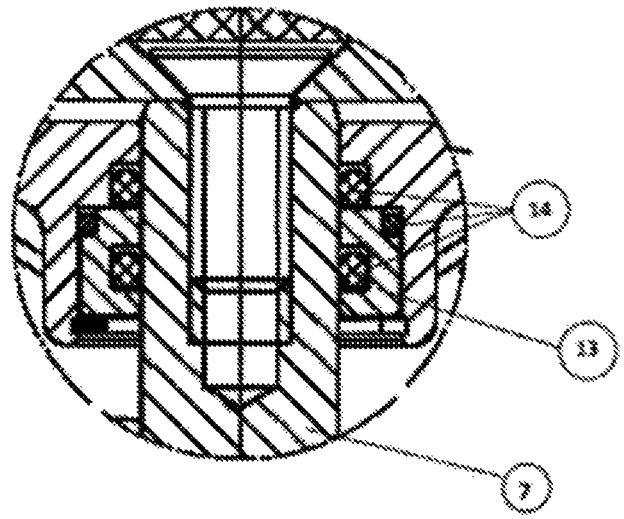
FIG. 5—The detailed view of the intermediate shaft bearing which comprises plastic hub of the diaphragm-diaphragm type spring brake actuator subject to the prior art.
Figure 6:
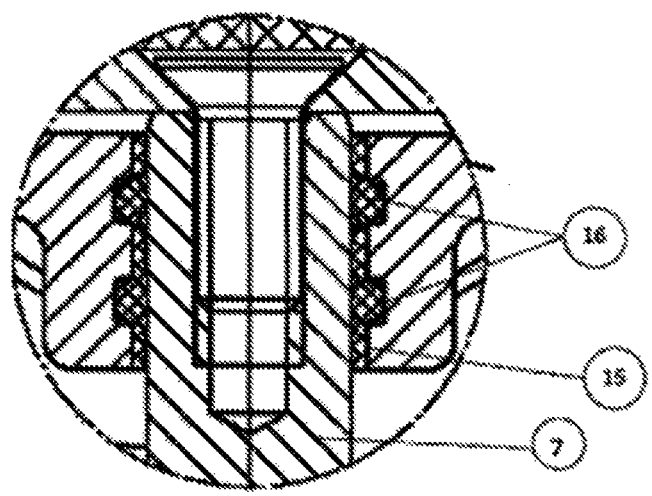
FIG. 6—The detailed view of the intermediate shaft bearing which comprises one-pieced rubber bearing section of the diaphragm-diaphragm type spring brake actuator subject to the prior art.
Figure 7:
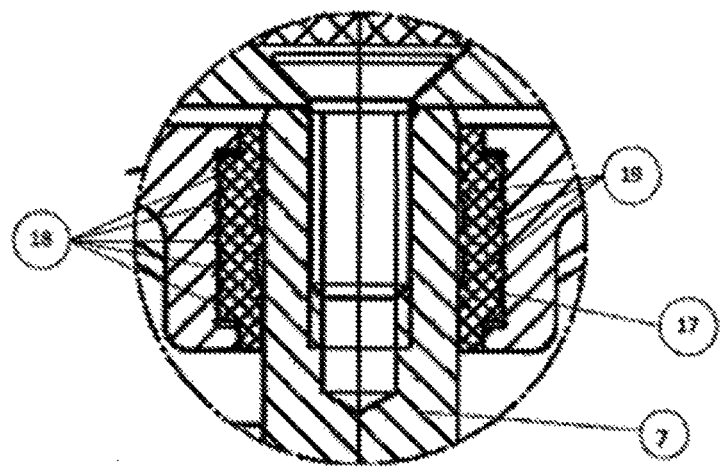
FIG. 7—The detailed view of the another embodiment of the intermediate shaft bearing which comprises one-pieced rubber bearing section of the diaphragm-diaphragm type spring brake actuator subject to the prior art.
Figure 8:
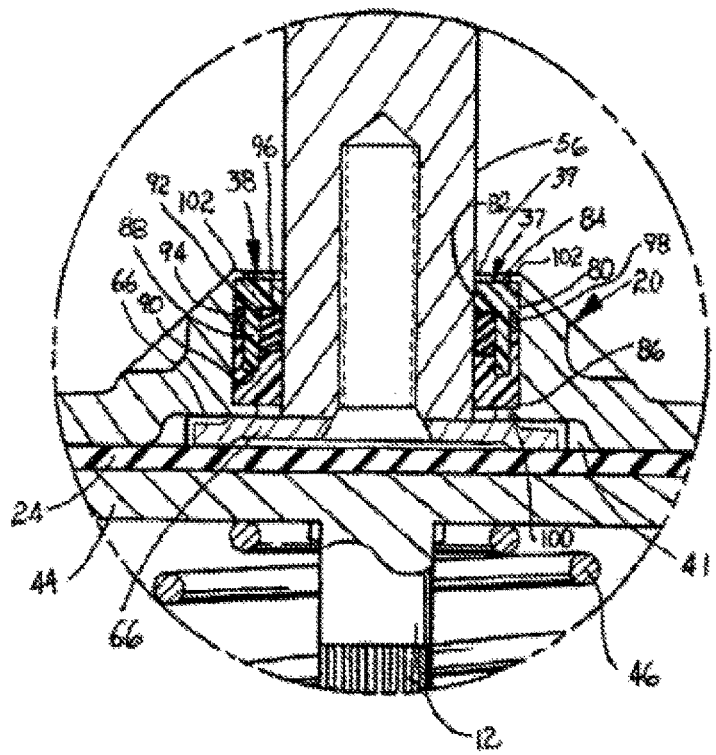
FIGS. 8, 9 and 10—The figures attached to the WO 9421501A1 patent application (for comparison).
Figure 9:
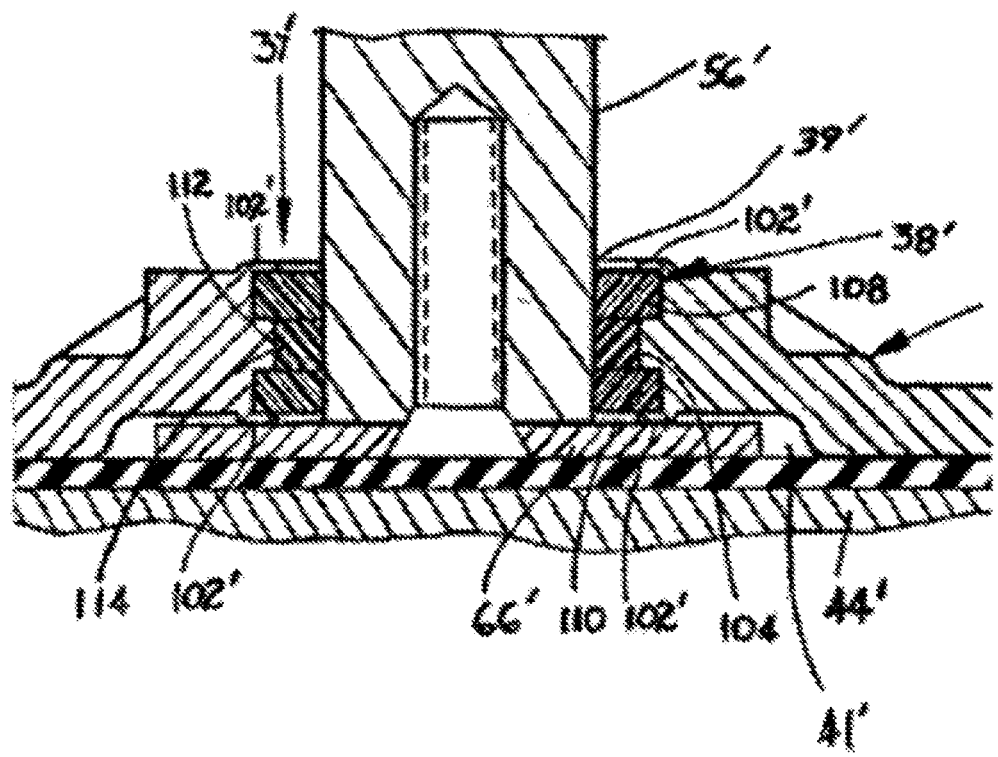
Figure 10:
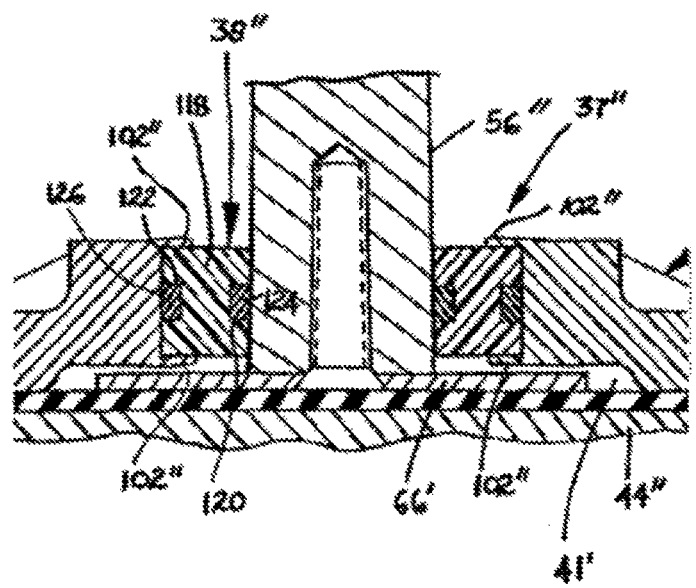
Figure 11:
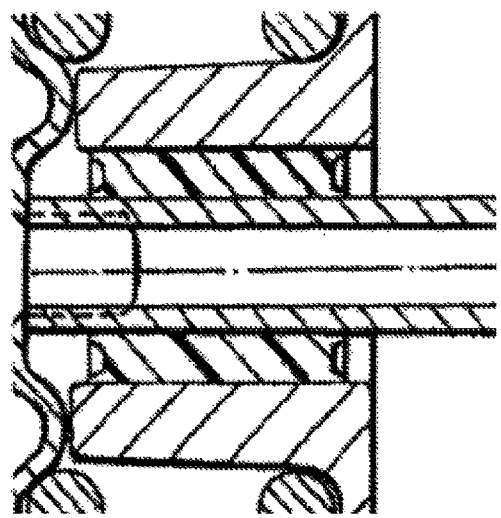
FIG. 11—The figures attached to the US2006131116A1 patent application (for comparison).

According to the present invention, the rubber bearing (15) of the prior art has been developed and it divided into two pieces. The two pieced center bearing (21) comprises rigid plastic bearing member (20) and rubber bearing member (22). The rigid plastic bearing member (20), is made of any kind of plastic material having a rigid structure and is mounted at the side of the parking chamber (1) and/or service chamber (8). the rigid plastic bearing member (20) has an "L" shaped section that allows it connect "form-fit" to the adapter plate (2). To ensure that the rigid plastic bearing member do not dislocate out of the slots due to pressure and friction forces. The rigid plastic bearing member (20) comprises a mounting slit (23) for said rigid plastic bearing member to be mounted by means of the "L" section form. (FIG. 3).

A two pieced center bearing (21) having different hardness produced from different materials, one of which is a rigid plastic bearing member (20) and the other of which is the rubber bearing member (22) has been developed according to the present invention, instead of the monolithic rubber bearing means (17) subject to the prior art.

As a result of this development, the metal-metal contact between the adapter plate (2) and the intermediate shaft (7) has been prevented, the abrasion has been decreased, the unwanted lateral loads, force losses and the output force fluctuations have also been decreased, sealing has been provided and more stable and secure force curves have been provided and the bearing in the axial direction has been strengthened.

The two pieced center bearing obtained by using the rubber bearing member (22) and the rigid plastic bearing member (20) together, provide the bearing and sealing functions of the plastic bearing (13) and the sealing means (11 and 14) located at the space where the parking chamber (1) and service chambers (8) converge.

As a result, when the chamber is working, the abrasion that is caused by lateral loads of the emergency spring (5), which causes contact and friction between intermediate shaft (7) and adapter plate (2); is prevented by using rubber bearing member (22), during the reciprocating movements of the intermediate shaft (7).

The rigid plastic bearing member (20) limits the unwanted radial and angular motion of the emergency spring (5) during this reciprocating movement of the intermediate shaft (7). So, air leakage of the center bearing which operates in a high pressurized air environment; which occurs by means of interruption of contact between intermediate shaft (7) and bearing members, is prevented.

Figure 2:
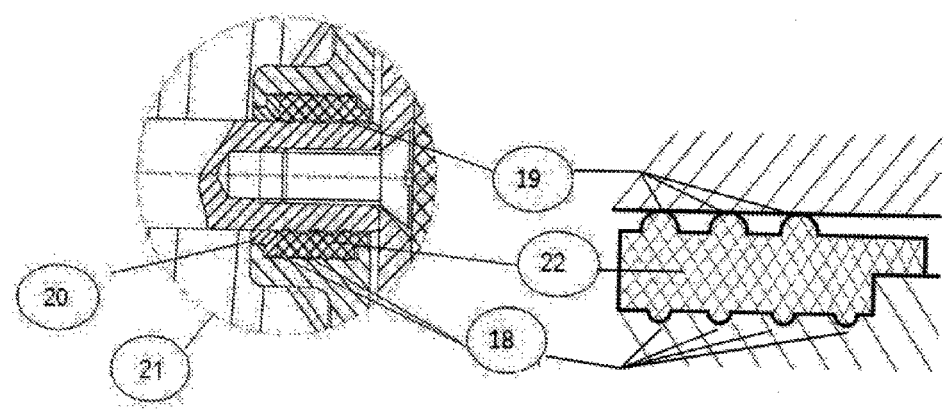
FIG. 2—Detailed view of the center bearing of the adapter plate and the intermediate shaft, of the diaphragm-diaphragm type spring brake actuator comprising the rubber and rigid plastic bearing members subject to the invention.

Moreover as it can be observed in FIG. 1 and FIG. 2, the usage of inner sealing rings (19) and the outer sealing rings (18) of the rubber bearing member (22), and o-rings or other sealing members such as circlips is no longer required.

The invention claimed is:

1. A spring brake actuator comprising,
a parking chamber comprising pressurized air,
an adapter plate containing an intermediate shaft,
an emergency diaphragm pushed by the intermediate shaft,
a flange that pushes the emergency diaphragm,
an emergency spring that pushes the flange after the pressure inside the adapter plate drops,
an intermediate shaft flange that is pushed by the flange connected to the intermediate shaft,
the intermediate shaft pushed by the intermediate shaft flange,
a service chamber inside which a service diaphragm moves,
wherein the intermediate shaft pushes the service diaphragm;
a shaft that is pushed by the service diaphragm,
a return spring that brings back the shaft wherein the return spring comprises;
a two pieced center bearing comprising two types of bearings having different hardness and materials, one of which is a rubber bearing member comprising an outer sealing ring and an inner sealing ring, providing sealing, preventing the contact of the intermediate shaft and the adapter plate; and the other of which is a rigid plastic bearing member which strengthens the bearing of the intermediate shaft in the adapter plate, decreases the lateral forces and prevents force losses, limits the flexibility of the intermediate shaft and strengthens sealing;
the rigid plastic bearing member having "L" shaped section which enables form-fit connection on adapter plate in order to ensure that the rigid plastic bearing member located at the side of the parking chamber and/or the service chamber do not dislocate due to pressure or friction forces;

a mounting slit that enables the mounting of the rigid plastic bearing member having an "L" shaped section located at the side of the parking chamber and/or the service chamber;

wherein the inner and outer profile of the rubber bearing member comprises different quantities of outer sealing rings and inner sealing rings.

* * * * *